United States Patent [19]
Wang

[11] Patent Number: 5,568,549
[45] Date of Patent: Oct. 22, 1996

[54] MOBILE TELEPHONE HOLDER

[76] Inventor: Chin-Yang Wang, No. 167, Lane 131, Sec. 2, Ture Hsing Rd., Panchiao City, Taipei Hsien, Taiwan

[21] Appl. No.: 523,872

[22] Filed: Sep. 6, 1995

[51] Int. Cl.$^6$ ................................................. H04M 1/00
[52] U.S. Cl. ........................... 379/446; 379/426; 379/454; 379/455
[58] Field of Search .................................. 379/426, 446, 379/454, 455, 447, 449; 248/206.3, 309.1, 309.3

[56] References Cited

U.S. PATENT DOCUMENTS 5,179,590  1/1993  Wang ........................ 379/454

Primary Examiner—Krista M. Zele
Assistant Examiner—Jack Chiang
Attorney, Agent, or Firm—Bucknam and Archer

[57] ABSTRACT

A mobile telephone holder including a mounting base having vacuum mounts for fastening to an automobile window glass or a flat surface, a holder frame for holding a mobile telephone, and a supporting arm connected between the mounting base and the holder frame, the supporting arm consisting of a deformable metal plate connected between the mounting base and the holder frame, and a bellows tube sleeved onto the deformable metal plate and coupled between the mounting base and the holder frame.

1 Claim, 2 Drawing Sheets

MOBILE TELEPHONE HOLDER

BACKGROUND OF THE INVENTION

The present invention relates to a mobile telephone holder which can be conveniently installed in an automobile window glass or a flat surface, and adjusted to the desired direction to hold a mobile telephone.

Mobile telephones have become more and more popular nowadays. When a mobile telephone is used, it may be carried in one's pocket, suitcase, etc. When one drives an automobile, one may prepare a mobile telephone holder to hold the mobile telephone. However, regular mobile telephone holders cannot be changed to the desired location or adjusted to the desired direction when installed in an automobile.

SUMMARY OF THE INVENTION

The present invention has been accomplished to provide a mobile telephone holder which eliminates the aforesaid problems. According to one object of the present invention, the mobile telephone holder comprises a mounting base, a supporting arm mounted on the mounting base, and a holder frame mounted on the supporting arm, wherein the mounting base has vacuum mounts for mounting on an automobile window glass or a flat surface. According to another aspect of the present invention, the supporting arm is comprised of a bellows tube reinforced by a deformable metal plate. Therefore, the supporting arm can be bent to different directions to change the position of the holder frame relative to the mounting base.

DETAILED DESCRIPTION OF THE PREFERRED EMBODIMENT

Figure 1:
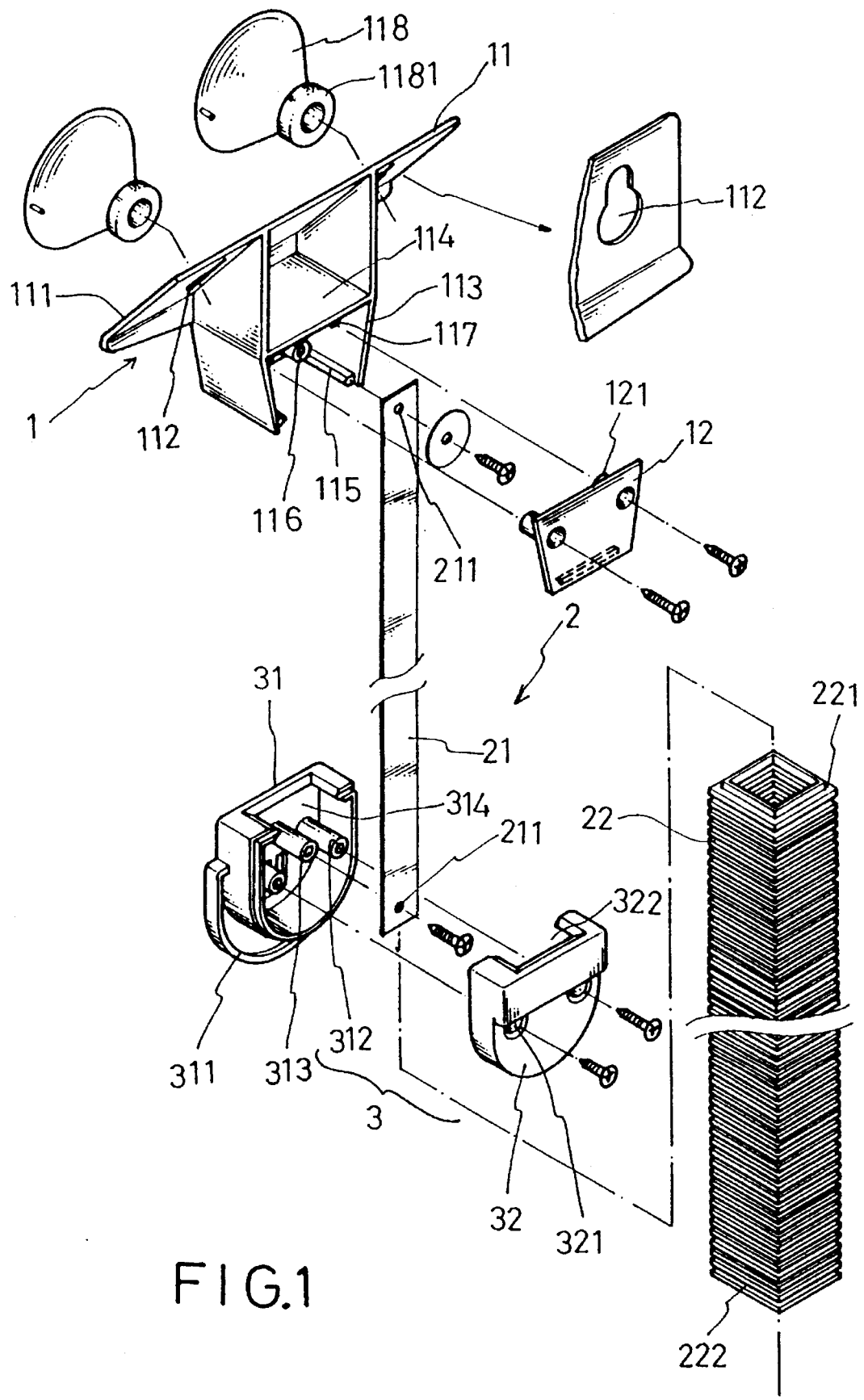
FIG. 1 is an exploded view of a mobile telephone holder according to the preferred embodiment of the present invention.
Figure 2:
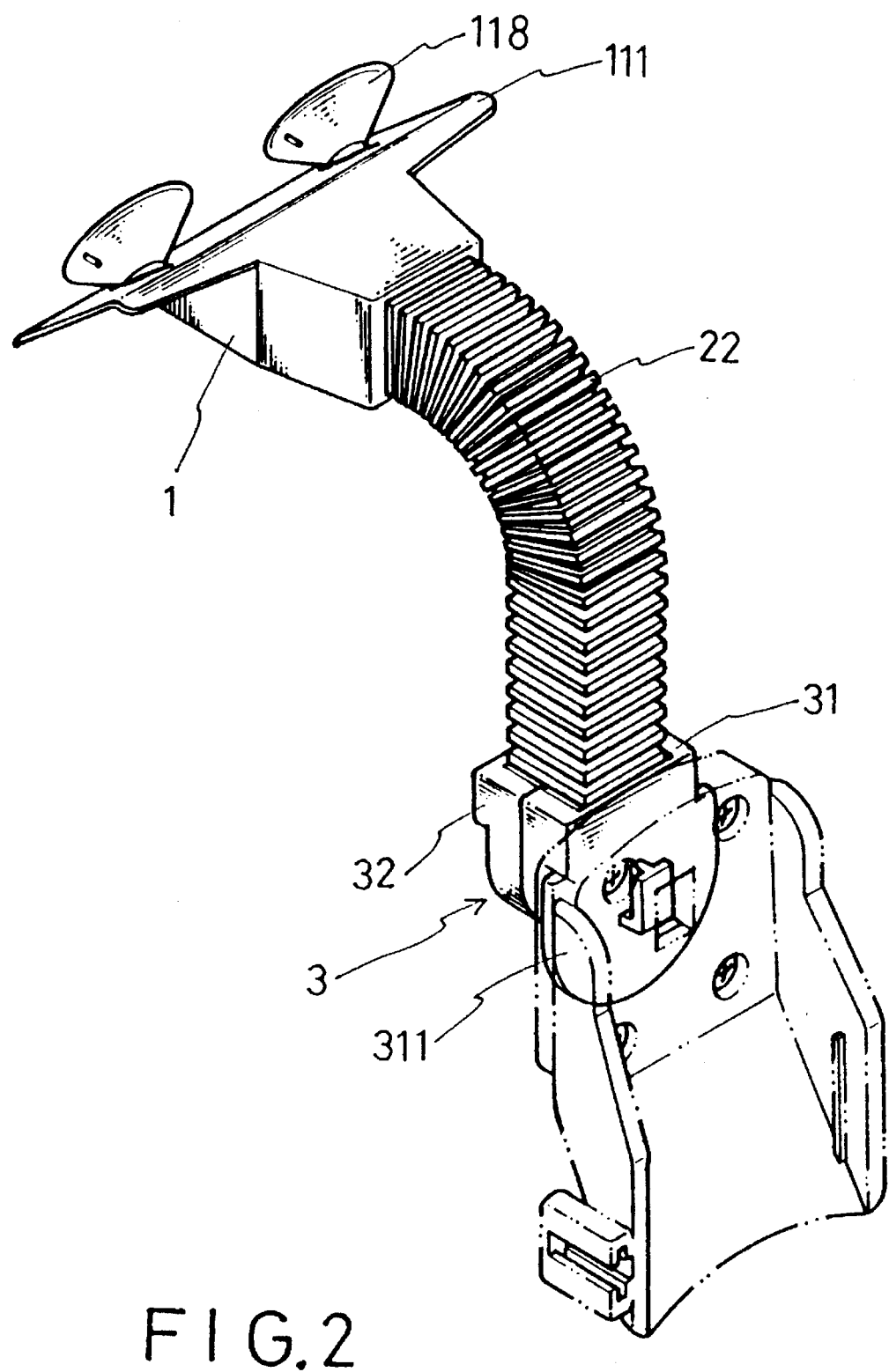
FIG. 2 is an elevational view of the mobile telephone holder shown in FIG. 1.

Referring to FIG. 1 and 2, a mobile telephone holder in accordance with the present invention is generally comprised of a mounting base 1, a supporting arm 2, and a holder frame 3.

The mounting base 1 comprises a casing 11 and a cover 12. The casing 11 comprises a flat bottom wall 111 having two key holes 112 near two opposite sides thereof for mounting a respective vacuum mount 118, two upright walls 113 raised from the flat bottom wall 111 between the key holes 112, a transverse wall 114 connected between the upright walls 113, two parallel rails 115 respectively raised from the upright walls 113 above the transverse wall 114, a post 116 disposed above the transverse wall 114, and two female screws 117 bilaterally disposed between the transverse wall 114 and the rails 115 within the upright walls 13 for mounting the cover 12. The vacuum mount 118 has a flanged coupling head 1181 fastened to one key hole 112 on the flat bottom wall 111 of the casing 1. The cover 12 is a flat plate having two mounting tubes 121 respectively fastened to the female screws 117 by a respective screw. The supporting arm 2 is comprised of a deformable metal plate 21 and a bellows tube 22 sleeved onto the deformable metal plate 21. The bellows tube 22 has a first outward flange 221 around the periphery at one end, which is engaged with the rails 115 of the mounting base 1, and a second outward flange 222 around the periphery at an opposite end. The deformable metal plate 21 has two mounting holes 211 at two opposite ends. Before the bellows tube 22 is sleeved onto the deformable metal plate 21 and inserted into the space between the upright walls 113 of the mounting base 1, one mounting hole 211 of the deformable metal plate 21 is fixed to the post 116 by a screw. The holder frame 3 comprises two symmetrical shells, namely, the left shell 31 and the right shell 32. The left shell 31 comprises a downward flange 311 defining a seat (not shown) at the front side for holding a mobile telephone, a back chamber 314, a plurality of female screws 312 and a post 313 disposed in the back chamber 314 for mounting the right shell 32 and the deformable metal plate 21. One mounting hole 211 of the deformable metal plate 21 is fixed to the post 313 of the left shell 31 by a screw. The right shell 32 comprises a back chamber 322 matched with the back chamber 314 of the left shell 31, and a plurality of mounting holes 321 respectively fastened to the female screws 312 by screws.

Referring to FIGS. 1 and 2 again, when the bellows tube 22 is sleeved onto the deformable metal plate 21, the mounting holes 211 of the deformable metal plate are respectively fixed to the post 116 of the mounting base 1 and the post 313 of the left shell 31 of the holder frame 3, then the first outward flange 221 of the bellows tube 22 is engaged with the rails 115 of the mounting base 1, and then the mounting tubes 121 of the cover 12 are respectively fixed to the female screws 117 of the mounting base 1, and then the second outward flange 222 of the bellows tube 22 is inserted into the back chambers 314 and 322 of the shells 31 and 32 of the holder frame 3, and then the mounting holes 321 of the left shell 31 are respectively fastened to the female screws 312 of the right shell 32 by a respective screw. When the left shell 31 and the right shell 32 are fastened together, the second outward flange 22 of the bellows tube 22 is retained inside the back chambers 314 and 322. At final, the flanged coupling heads 1181 of the vacuum mounts 118 are respectively fastened to the key holes 112 of the flat bottom wall 111 of the mounting base 1.

When the mobile telephone holder is assembled, it can be installed in the windshield or one door window glass of an automobile by means of the vacuum mounts 118. Through the vacuum mounts 118, the mobile telephone holder can also be mounted on a flat surface. When installed, the supporting arm 2 can be bent to the desired direction.

It is to be understood that the drawings are designed for purposes of illustration only, and are not intended as a definition of the limits and scope of the invention disclosed.

I claim:

1. A mobile telephone holder comprising:

a mounting base, said mounting base comprising a casing and a cover covered on said casing, said casing comprising a flat bottom wall having two key holes near two opposite sides, two vacuum mounts respectively fixed to said key holes for fastening said mounting base to a flat surface, two upright walls raised from said flat bottom wall between said key holes, a transverse wall connected between said upright walls, two parallel rails respectively raised from said upright walls above said transverse wall, a post disposed above said transverse wall, and two female screws bilaterally disposed between said transverse wall and said rails within said upright walls, said cover being a flat plate having two mounting tubes respectively fastened to the female screws of said mounting base by a respective screw;

a holder frame fixedly secured to said supporting arm remote from said mounting base for holding a mobile telephone, said holder frame comprising a left shell and a right shell, said left shell comprising a downward flange defining a seat for holding a mobile telephone, a back chamber, a plurality of female screws and a post disposed in the back chamber of said left shell, said right shell comprising a back chamber matched with the back chamber of said left shell, and a plurality of mounting holes respectively fastened to the female screws of said left shell by a respective screw; and a supporting arm connected to said mounting base, said supporting arm comprised of a deformable metal plate and a bellows tube sleeved onto said deformable metal plate, said bellows tube having a first outward flange around the periphery at one end, said first flange being engaged with the rails of said mounting base, and a second outward flange around the periphery at an opposite end, said second flange being fastened inside the back chambers of said left shell and said right shell, said deformable metal plate having a first mounting hole at one end fixed to the post of said mounting base by a screw and a second mounting hole at an opposite end fixed to the post of said left shell.

* * * * *